Jan. 8, 1952     T. SOLUM ET AL     2,582,078
GLASS CUTTING APPARATUS
Filed Jan. 30, 1951
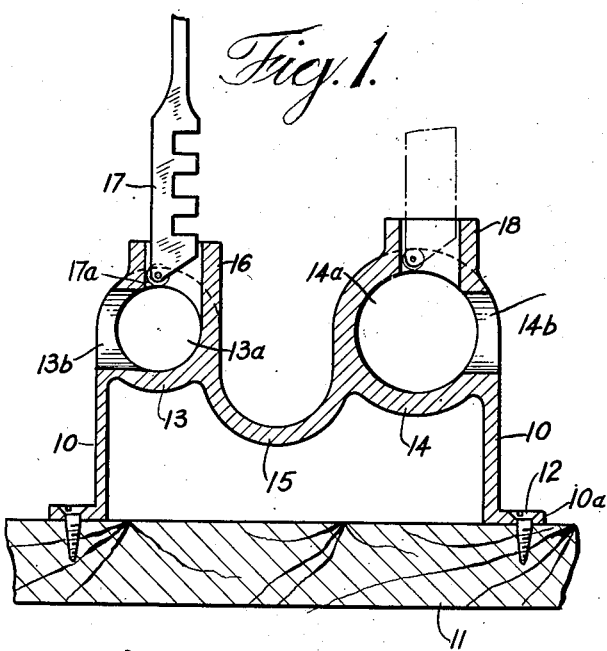
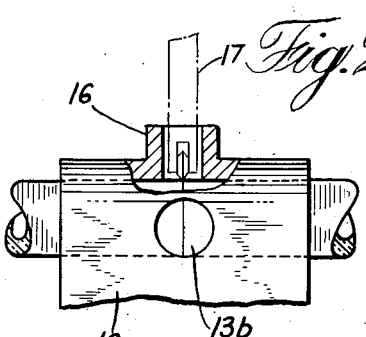
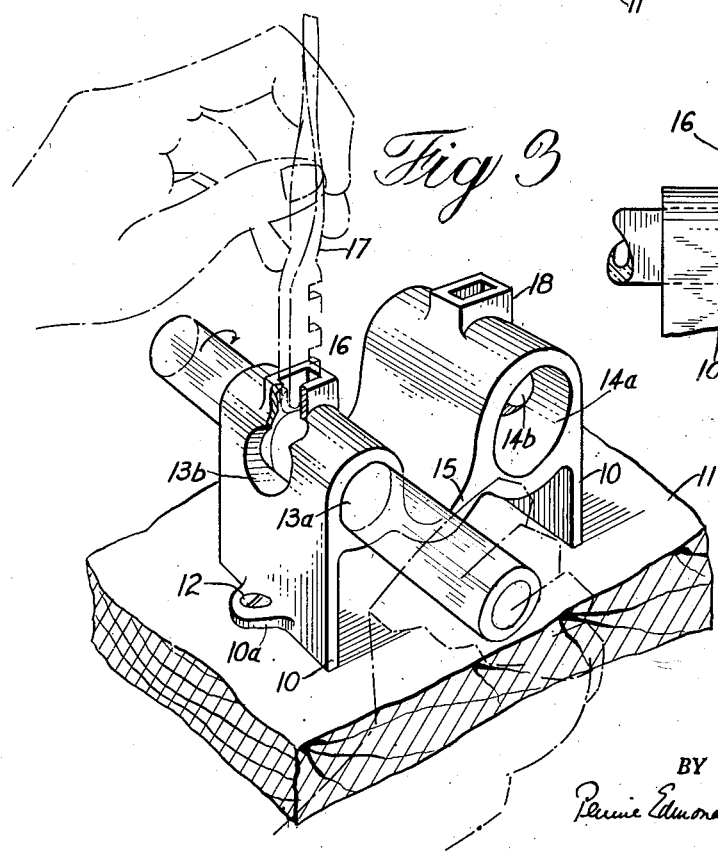
INVENTORS
Thorsten Solum
BY Herbert C. Franson
Pennie Edmonds Morton Barrows & Taylor
ATTORNEYS

Patented Jan. 8, 1952

2,582,078

UNITED STATES PATENT OFFICE 2,582,078

GLASS CUTTING APPARATUS

Thorsten Solum and Herbert C. Franson, Norwalk, Conn.

Application January 30, 1951, Serial No. 208,505

2 Claims. (Cl. 49—48)

This invention relates to devices for cutting glass and is concerned more particularly with a novel device of simple, inexpensive construction, which may be employed with great facility in accurately cutting glass tubes and rods to length.

At the present time, plumbers, steam-fitters, and steam boiler operators have frequent occasion to cut glass tubing for gauge glasses and, unless the tubing is cut with fair accuracy and with clean squared ends, the gauge glasses so produced are not usable. Also, in setting up chemical glassware for laboratory use, it is often necessary to cut glass tubing to length for use in connections, etc. So far as we are aware, the only tool now available for the purpose is an ordinary glass cutter having a cutting element in the form, for example, of a small hardened steel wheel, and it is difficult to hold the tubing and use such a cutter to make the cut at the desired place.

The present invention is, accordingly, directed to the provision of a simple device for cutting glass tubing, rods, etc. which can be employed by an unskilled person in making an accurate cut at right angles to the axis of the tubing, so that the piece cut is not only of proper length but also has squared ends. The device is light and compact, so that it can be easily carried in a tool bag, and it is durable and not subject to breakage.

For a better understanding of the invention, reference may be made to the accompanying drawing, in which:

Fig. 1 is a transverse vertical sectional view of one form of the new device;

Fig. 2 is a fragmentary side elevational view of the device; and

Fig. 3 is a view of the device in perspective and with parts broken away.

The device in the form illustrated is for use in cutting tubing or rods of two different diameters and it includes a support formed by legs 10 attached to a base 11, which may be a block of wood. The legs preferably have lugs 10a at their lower ends resting upon the block and secured thereto by screws 12.

The legs support a pair of holders 13, 14 connected by a web 15 and having respective parallel horizontal open-ended passages 13a, 14a therethrough. The passages are of circular cross-section and different diameter and passage 13a is preferably slightly greater in diameter than ⅝" and passage 14a is preferably slightly greater in diameter than 1". The outer sides of the holders are formed with sight openings 13b, 14b, respectively, which lead into the passages 13a, 14b about mid-way between their ends.

A boss 16 is formed on top of holder 13 in line with the sight opening 13b and the boss has a vertical passage through it. The vertical passage is oblong in section and of such dimensions as to receive the cutting end of a conventional glass cutter 17 with a fairly snug fit. The glass cutter is of the type having a hardened steel cutting wheel 17a and the vertical passage is so formed that one short side lies close to a vertical plane through the axis of passage 13a. Accordingly, when the end of the cutter is inserted into the vertical passage and the cutter is held in a vertical position, the cutting wheel bears upon the top center of a tube or rod within passage 13a.

The holder 14 is similarly provided with a boss 18 having a vertical passage through it to receive the cutting end of glass cutter 17. The passage through boss 18 has its inner narrow side lying close to a vertical plane through the axis of passage 14a for the purpose set forth above.

In the use of the device in cutting a piece of ⅝" tubing 19, for example, the tubing is circumferentially marked with a crayon at the place, where the cut is to be made, and inserted into passage 13b, until the mark forms the vertical diameter of sight opening 13b. The tubing is then held firmly in one hand in this position and the cutter 17 is inserted into the vertical passage through boss 16 with the cutting wheel adjacent the inner narrow side of the vertical passage through the boss. This places the cutting wheel on the mark on the tubing at the top of the latter and, while downward pressure is applied to the cutter, the tubing is rotated while held against endwise movement. The tubing can thus be cut in a plane at right angles to the axis of the tubing, so that the tubing will have squared ends. If the tubing is of 1" diameter, it is inserted in passage 14a and cut by the cutter lying within the vertical passage through boss 18, in the manner described.

The holders 13, 14, web 15, and legs 10 are preferably integral and cast of a light metal, such as aluminum. As the device is subjected to little strain in use, it may be made of a suitable plastic by a molding operation, if desired. Preferably, the device includes holders having passages of the diameters stated, since most tubing for gauge glasses and other common uses is of either ⅝" or 1" diameter. It will be apparent that the device may include a single holder or more than two for special purposes. Also, other forms of glass cutter may be used, although that illustrated is the most commonly employed and generally available.

We claim:

1. A device for use in cutting glass tubing, which comprises a support, a holder carried by the support and having an open-ended horizontal passage of circular cross-section and a sight opening leading into the side of the passage, and a boss on the holder above the passage, the boss having an open-ended vertical passage of non-circular cross-section leading to the horizontal passage, the vertical passage having one wall lying close to a vertical plane through the axis of the horizontal passage.

2. A device for use in cutting glass tubing, which comprises a support, a holder carried by the support and having an open-ended horizontal passage of circular cross-section and a sight opening leading into the side of the passage, a boss on the holder above the passage, the boss having an open-ended vertical passage of non-circular cross-section leading to the horizontal passage, the vertical passage having one wall lying close to a vertical plane through the axis of the horizontal passage, and a cutting tool having a shank receivable in the vertical passage and a cutting element at the inner end of the shank.

THORSTEN SOLUM.
HERBERT C. FRANSON.

No references cited.